United States Patent [19]

Cetnar et al.

[11] Patent Number: 5,755,918
[45] Date of Patent: May 26, 1998

[54] HAND-HELD LABELING APPARATUS WITH MEASURING DEVICE AND PRINTER

[75] Inventors: John S. Cetnar, West Manchester; Amy S. Christopher, Miamisburg; Ronald L. Fogle, Springboro, all of Ohio; Monte R. Lucas, Powder Springs, Ga.; James A. Makley, Springboro; Donald A. Morrison, Kettering, both of Ohio

[73] Assignee: Monarch Marking Systems, Inc., Dayton, Ohio

[21] Appl. No.: 556,561

[22] Filed: Nov. 13, 1995

[51] Int. Cl.$^6$ .............................. B65C 11/02; G01B 3/12
[52] U.S. Cl. .................. 156/360; 156/577; 156/579; 156/DIG. 49; 33/711; 33/737; 33/773; 33/781
[58] Field of Search .................. 156/DIG. 49, 360, 156/579, 577; 33/1 V, 781, 773, 737, 711

[56] References Cited

U.S. PATENT DOCUMENTS

| | | |
|---|---|---|
| 4,176,458 | 12/1979 | Dunn .......................... 33/781 |
| 4,652,317 | 3/1987 | Seestrom ............... 156/DIG. 49 X |
| 4,734,713 | 3/1988 | Sato et al. ............. 156/DIG. 49 X |
| 5,447,379 | 9/1995 | Pou . |
| 5,477,622 | 12/1995 | Skalnik . |
| 5,485,682 | 1/1996 | LaBreton .................. 33/773 |
| 5,560,119 | 10/1996 | LeBreton .................. 33/773 |

FOREIGN PATENT DOCUMENTS

| | | | |
|---|---|---|---|
| 605878 | 7/1994 | European Pat. Off. ........ 156/DIG. 49 |
| 3-250383 | 11/1991 | Japan . |

OTHER PUBLICATIONS

CubiCal Brochure entitled Instant–Accurate–Hand Held–Cubic Audit System Cubical Now you can "Cube it + Prove It!", no known date.

CubiCal Brochure entitled "A New Dimension In Freight Profits", date unknown.

Primary Examiner—Jeff H. Aftergut
Attorney, Agent, or Firm—McAndrews, Held & Malloy, Ltd.

[57] ABSTRACT

The hand-held apparatus of the present invention includes an integral printer and measuring device so that measurement information obtained from the measuring device may be automatically printed, used to determine additional information to be printed such as price information, or merely displayed. A measuring wheel having detectable marks disposed about the periphery thereof is rotatably mounted on the housing of the apparatus in proximity to a sensor that detects the marks. This sensor is positioned on the housing to not only detect the marks on the measuring wheel but to also detect the presence or absence of a label dispensed from the housing so as to provide an on-demand printing mode of operation. A controller is responsive to the sensor in the on-demand mode of operation for controlling a printhead to print on a supply when the previously printed supply has been removed from the apparatus. The controller is also responsive to the sensor in a second mode of operation for counting the marks that pass the sensor as the measuring wheel is rotated when the apparatus is rolled across a dimension of an object to be measured, such as the length, width or height of the object.

34 Claims, 6 Drawing Sheets

HAND-HELD LABELING APPARATUS WITH MEASURING DEVICE AND PRINTER

FIELD OF INVENTION

The present invention relates to a hand-held apparatus with a measuring device and printer and more particularly to a hand-held labeler having a measuring wheel rotatably mounted thereon and a sensor in proximity to the wheel so as to provide measurement information as well as information regarding the presence or absence of a dispensed label to control printing.

BACKGROUND OF THE INVENTION

Hand-held labelers are known having a printhead for printing on a web of record members such as labels that are then dispensed and applied by an applicator. Typically, the data to be printed is entered via a keyboard mounted on the labeler housing. Alternatively, the data to be printed is downloaded from a host computer via a hard wired communication interface or a radio frequency communication interface. Heretofore, when measurement information such as the size or weight of a package was desired to be printed, the user had to obtain that measurement information from another device capable of making the desired measurement. The user then had to manually enter the measurement information into the labeler if the user desired to print it. One known system connected a measurement device via a cable to a portable label printer that is carried on a belt worn by a user to avoid the need for manual entry of the measurement data into the printer. However, because two devices, the printer and separate but connected measuring device, must be carried by the user, this system is cumbersome.

SUMMARY OF THE INVENTION

In accordance with the present invention, the disadvantages of prior hand-held labelers have been overcome. The hand-held apparatus of the present invention includes an integral printer and measuring device so that measurement information obtained from the measuring device may be automatically printed, used to determine additional information to be printed such as price or merely displayed, easily without the need of a separate device.

More particularly, the hand-held apparatus of the present invention includes a printhead mounted in a housing of the of the apparatus. A motor drives a supply past the printhead for printing thereon and at least partially out from the housing to dispense the printed supply. A sensor is positioned on the housing to detect the presence or absence of a dispensed, printed supply. A measuring wheel is rotatably mounted on the housing in proximity to the sensor so that the sensor can also detect marks spaced about the periphery of the measuring wheel as the measuring wheel rotates. A controller is responsive to the sensor in a first mode of operation for controlling the printhead and/or motor depending upon the presence or absence of a dispensed supply. The controller is also responsive to the sensor in a second mode of operation for counting the marks passing the sensor as the measuring wheel is rolled along a dimension of an object, such as its length, width or height. The mark count accumulated by the controller represents a measurement of the dimension of the object along which the measurement wheel is rolled.

These and other advantages and novel features of the present invention, as well as details of an illustrated embodiment thereof, will be more fully understood from the following description and drawings.

DESCRIPTION OF THE PREFERRED EMBODIMENT

Figure 1:
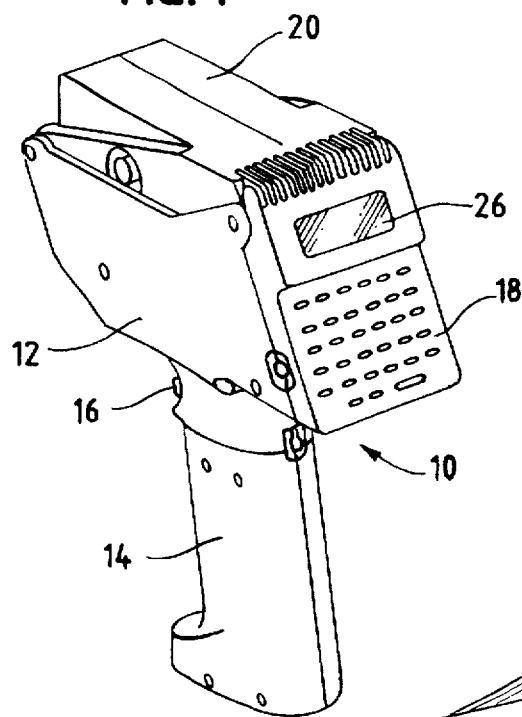
FIG. 1 is a perspective view of a hand-held apparatus in accordance with the present invention in the form of a labeler as viewed from the back.

A hand-held apparatus with measuring device and printer in accordance with the present invention is shown in FIG. 1 as a labeler 10. The labeler 10 includes a housing 12 having a detachable battery containing handle 14. Mounted at the handle 14 is a trigger switch 16 that is actuable by a user to control a print and label dispense operation in a manual print mode. The trigger switch 16 is also actuable by a user in a measuring mode of operation to signal the start of a measurement and, if desired, to signal the end of a measurement as discussed in detail below.

Figure 3:
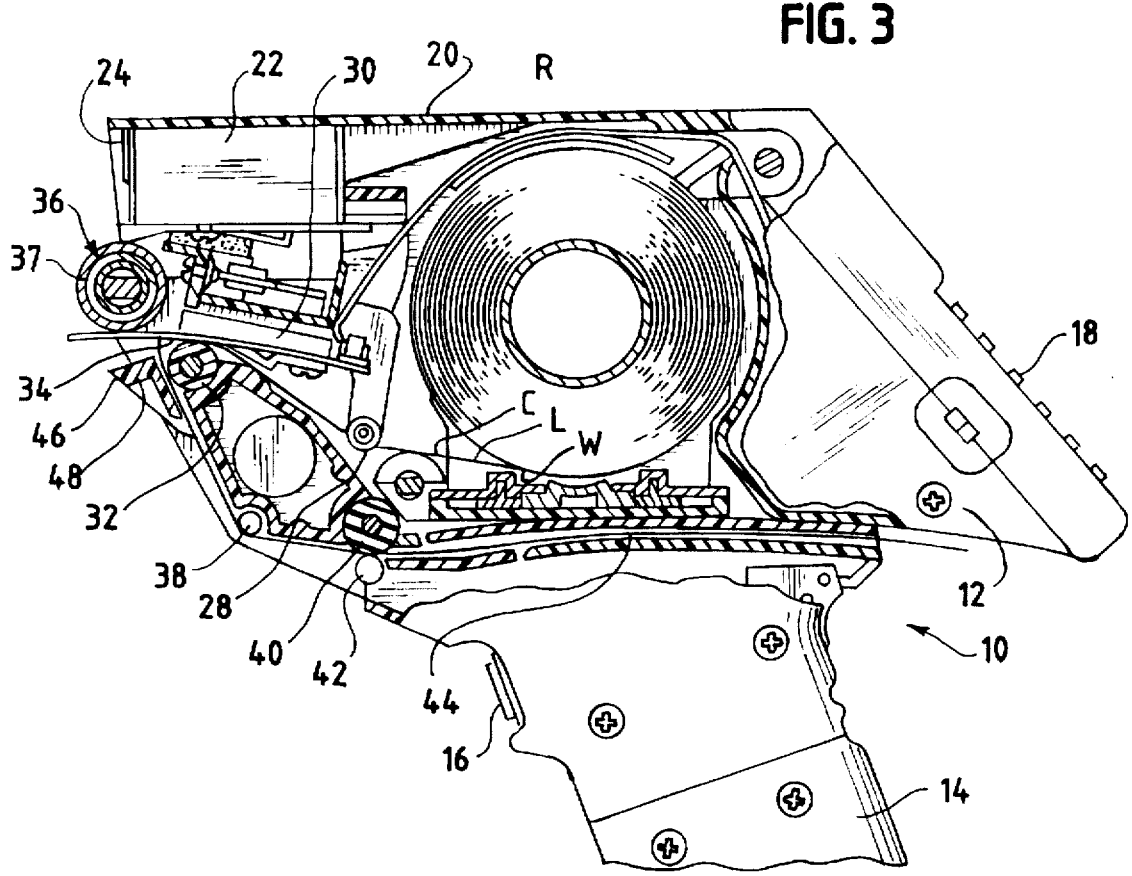
FIG. 3 is a partial sectional elevational view of the labeler of FIG. 1.

A keyboard 18 is mounted on the housing 12 for manually entering data and selecting the mode of operation of the labeler 10. Mounted in a housing section 20 is a barcode scanner 22 with a lens 24 positioned at the front end of the scanner as shown in FIG. 3. The barcode scanner 22 allows barcode data to be scanned and entered into the labeler 10 for data collection. A display 26 is mounted on the housing 12 above the keyboard 18 to display information to the user such as a menu with entries that are selectable for data input, prompts to advise the user what to do next, etc. The display 26 may also be controlled to display data derived from scanned barcodes, data derived from a measurement operation and/or data to be printed by the labeler 10.

As shown in FIG. 3, the labeler 10 mounts a supply roll R of a composite web C of record members that includes a series of labels L releasably adhered to a carrier web W. The composite web C passes from the roll R into guided relationship with a guide roll 28 and from there to a printhead 30 and a platen roll 32. A delaminator 34 is positioned adjacent to the printhead 30. The carrier web W passes about the delaminator 34 causing a label L to be delaminated from the carrier web W as the web W is advanced into contact with the platen roll 32. The web W is advanced from the platen roll 32 about a guide roller 38 into the nip of a feed roll 40 and a back-up roll 42. The rolls 40 and 42 advance the carrier web W through a chute generally indicated at 44 from which the carrier web W exits the housing 12 of the labeler 10.

As the label L is delaminated, it is advanced into label applying relationship to and under an applicator 36. The applicator 36 includes a roll 37 and a number of circular ribs, such as shown at 52 and 54, the ribs being spaced along the length of the applicator 36. The ribs of the applicator 36 are such as to roll on the label as the label is being applied by the applicator 36. A label support 46 is mounted on the housing below the applicator 36 so as to support a printed label prior to application by the applicator. The label support 46 houses an on-demand sensor 48 that is employed in one mode to detect the presence or the absence of a label dispensed from the housing 12. In another mode, the sensor 48 cooperates with a measuring wheel 50 to allow the labeler 10 to measure the length, width and height of an object to which a label generated by the labeler 10 is to be applied, for example.

Figure 2:
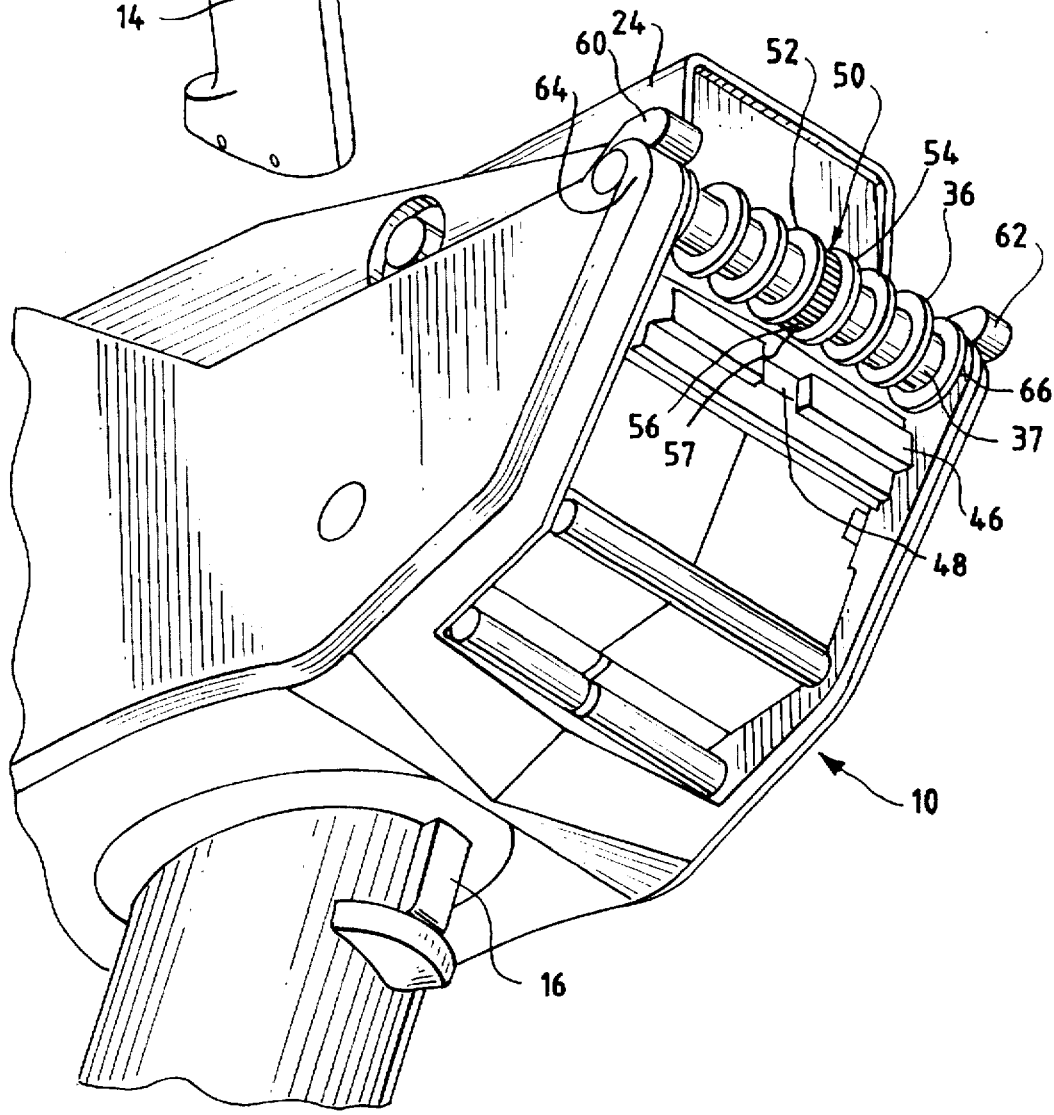
FIG. 2 is a partial perspective view of the hand-held labeler of FIG. 1 as viewed from the front to illustrate the measuring wheel and sensor.
Figure 4:
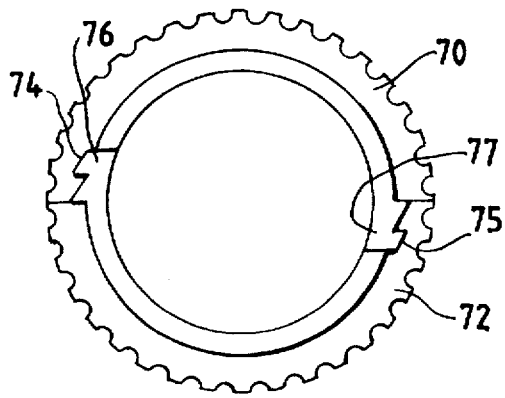
FIG. 4 is an end view of the measuring wheel of FIG. 4.
Figure 5:
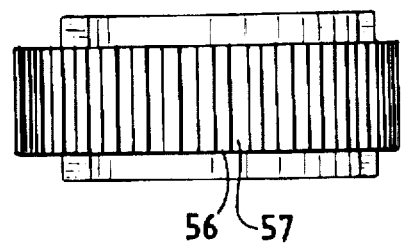
FIG. 5 is a side view of the measuring wheel of FIG. 4.

More particularly, as shown in FIGS. 2, 4 and 5, the measuring wheel 50 is mounted on the applicator 36 for rotation therewith and in proximity to the on-demand sensor 48 so that the sensor 48 can detect marks spaced about the periphery thereof. Specifically, the measuring wheel 50 is mounted on the applicator 36 between a pair of adjacent ribs 52 and 54 of the applicator wherein the ribs 52, 54 are centrally located so that the measuring wheel 50 is directly above the on-demand sensor 48. The measuring wheel 50 has a sufficiently small outer diameter so that it does not extend above the ribs 52, 54 on the applicator 36. In particular, the outer diameter of the wheel 50 is less than the outer diameter of the applicator roll ribs 52, 54 so that the wheel 50 does not engage a label when the label is being applied by the ribs 52, 54 of the applicator 36.

The measuring wheel 50 has black and white or otherwise reflecting and non-reflecting alternating marks 56, 57 disposed about the outer periphery of the measuring wheel 50 wherein the marks or more specifically the transitions between reflecting and non-reflecting marks are detectable by the on-demand sensor 48. The marks are equally spaced about the periphery of the measuring wheel 50 so that each mark represents a given distance of travel as the measuring wheel rotates. This given distance is stored in a non-volatile memory of the labeler 10 so that the labeler can convert the number of marks detected to a measurement of the distance traveled by the wheel in the desired units during a measurement process.

Figure 6:
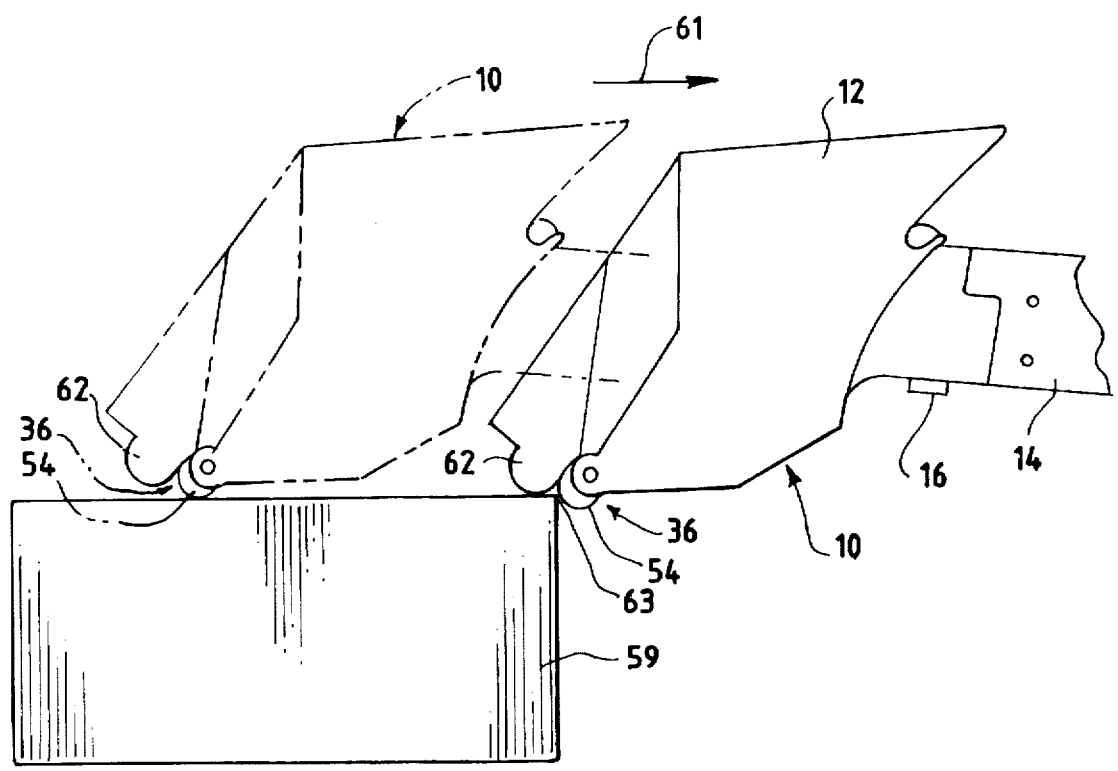
FIG. 6 is a side view of an object to be measured and the labeler shown in phantom in a first position and shown with solid lines in a second position at which the labeler stops after being rolled from the first position to an edge of the object.

In order to utilize the labeler 10 to measure a dimension, such as the length, width or height of an object 59 as shown in FIG. 6, the labeler 10 is pulled back in the direction of the arrow 61 so that the applicator 36 rolls across the dimension of the object 59 to be measured causing the applicator ribs 52, 54 to rotate. As the applicator ribs rotate, the measuring wheel 50 rotates and the sensor 48 provides a signal each time a mark 56, 57 or more specifically, the transition therebetween is detected. As discussed in detail below, the labeler counts the signals representing each mark passing the sensor and utilizes the number of marks counted and the stored distance of travel represented by one mark to determine the total distance traveled as the measuring wheel 50 is rolled along a dimension of the object.

In order to prevent the measuring wheel 50 from continuing to rotate after one side of the object has been measured, a pair of stop members 60, 62 or the like are mounted on the portions 64, 66 of the housing 12 that supports respective ends of the applicator 36 such that the stops 60, 62 are above the applicator 36. As the labeler 10 is rolled across an object in the direction of the arrow 61, the stop members 60, 61 do not engage the object as shown by the labeler 10 depicted in phantom. However, once the applicator 36 reaches a corner of the object, the corner catches on the stops 60 and 62 to prevent the applicator 36 from rolling around the object's corner to another side thereof. Because the stops 60, 62 prevent the measuring wheel 50 from continuing to rotate beyond an edge 63 of the object 59, an accurate measurement of one dimension such as the width of the object can be obtained. It is noted that the stops 60, 62 may be formed as rubber guides or the like attached to the housing 12 in proximity to the measuring wheel 50 as shown in FIG. 2. Alternatively, the stops 60, 62 may be integrally formed as part of the housing 12 as shown in FIG. 6 wherein the stops 60, 62 are formed as cam surfaces on the housing 12.

As shown in FIG. 4, the measuring wheel 50 may be formed in two identical parts or halves 70 and 72. Each half 70, 72 includes a respective notch 74, 75 formed in one end thereof wherein the notch 74, 75 engages a projection 76, 77 on the end of the other half of the wheel 50. This configuration of the measuring wheel 50 allows the measuring wheel to be easily snapped onto an existing applicator 36 for rotation with respect to the housing 12 of the labeler 10.

Figure 7:
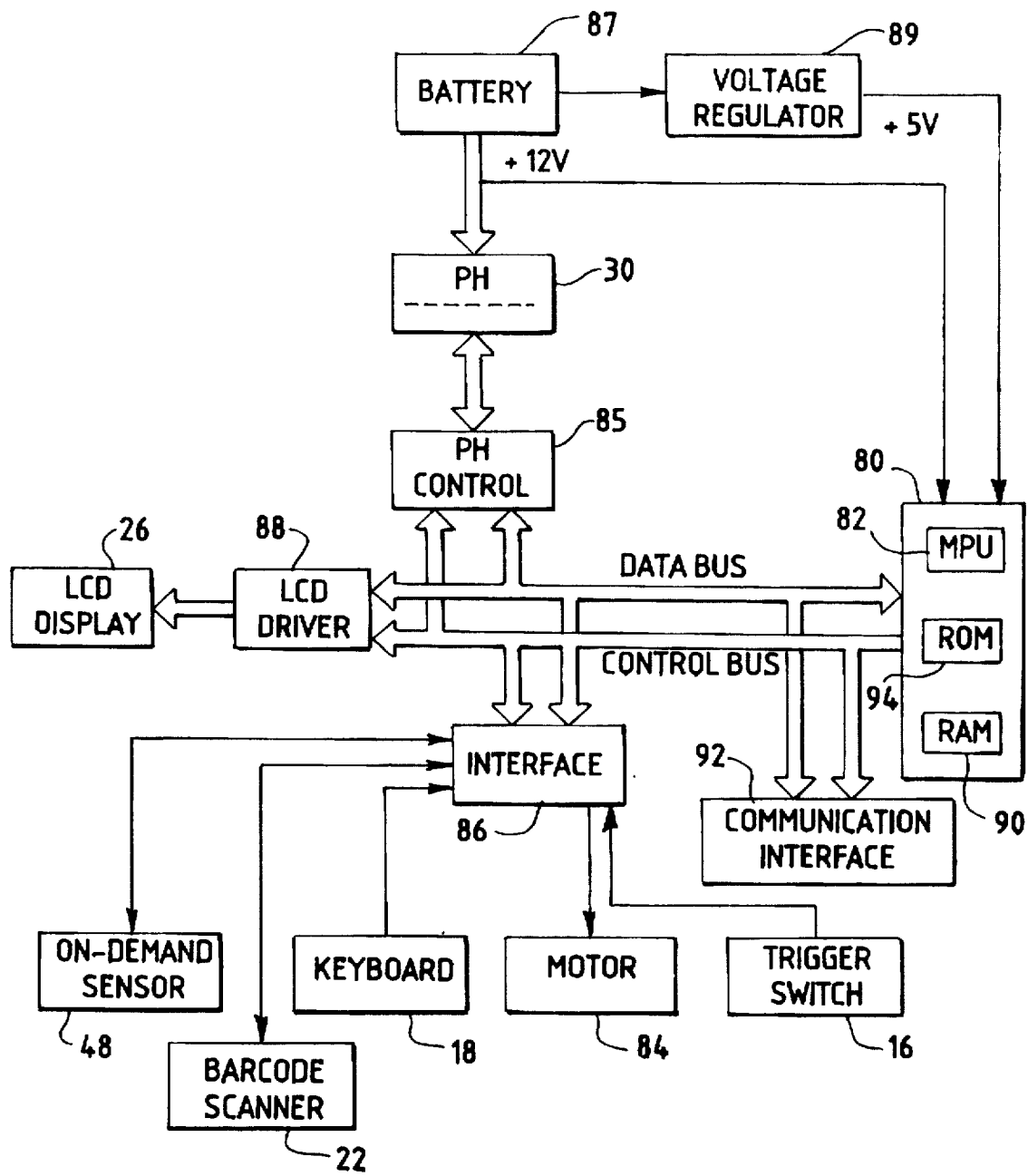
FIG. 7 is a block diagram of the labeler of FIG. 1.

As shown in FIG. 7, the labeler 10 includes a controller 80 with a microprocessor 82 for controlling a motor 84 through an interface 86 to move the composite web C in a direction perpendicular to the line of print elements of the printhead 30 so as to print information on a label. The controller 80 controls the printhead 30 through a printhead control 85. The printhead 30 is powered by a battery 87, the output of which is also applied to a voltage regulator 89 that provides +5 volts to the microprocessor 82. The microprocessor 82 also controls the display 26, which may be a liquid crystal display, through an LCD driver 88. The user may respond to a prompt depicted on the display 26 via the keyboard 22 or trigger switch 16 that are coupled to the controller 80 through the interface 86. It is noted that although a key of the keyboard 18 may be assigned as a trigger key, preferably the trigger key or switch is mounted on the handle 14 of the labeler 10 as shown in FIG. 1 for easy actuation thereof to cause one or more labels to be printed or to control the measuring operation as discussed in detail below. The controller 80 controls the on-demand sensor 48 and barcode scanner 22 so as to turn on each of these respective devices only when their operation is required. The controller 80 is responsive to data representing a scanned barcode received from the barcode scanner 22 for storing the data in a memory such as a RAM 90. The data stored in the RAM 90 may be selectively displayed on the display 26, uploaded via a communication interface 92 to a host computer or the like and/or printed with other data such as measurement information on a label. The communication interface 92 may be a hardwired such as a RS 232 communication interface. Alternatively, the interface 92 may be wireless utilizing radio frequency communications or the like.

The microprocessor 82 operates in accordance with software routines stored in a non-volatile memory such as the ROM 94 of the controller 80 so as to control the printing, dispensing and measuring operations of the labeler 10 as well as the data collection operations thereof via the barcode scanner 22. The microprocessor 82 controls the operations of the labeler 10 in a number of different modes. For example, in a first mode, the microprocessor 82 is responsive to an output signal from the on-demand sensor 48 indicating the absence of a dispensed label for automatically controlling the printhead 32 to print while causing the motor 84 to advance the label web W. In this mode, one label or a strip of labels is automatically printed and dispensed when the on-demand sensor 48 determines that the previously printed label or strip of labels has been removed from the labeler 10. In a second mode of operation such as a measuring mode, the microprocessor counts the number of signals representing a mark passing the sensor 48 so as to provide a count representing the distance across which the applicator 36 is rolled with the measuring wheel 50 rotating therewith. In this second mode of operation, the microprocessor 82 may be responsive to a first actuation of the trigger switch 16 to start counting the signals representing marks from the sensor 48 and the microprocessor 82 may be responsive to a second, subsequent actuation of the trigger switch 16 to stop counting when the measurement is completed. In a third mode of operation, the microprocessor 82 may be responsive to the trigger switch 16 so as to control the printhead 32 to print and the stepper motor 84 to advance the web W so as to dispense a printed label. It is noted that the selection of the mode of operation of the labeler 10 may be controlled by an application program stored in a memory of the labeler 10. In this case, when a measurement is required by the application program, the microprocessor 82 operating in accordance therewith controls the display 26 to depict a prompt to the user so as to prompt the user to start the measuring operation as described above. Alternatively, the user may select the mode of operation of the labeler 10 by actuating one or more keys of the keyboard 18.

Figure 8:
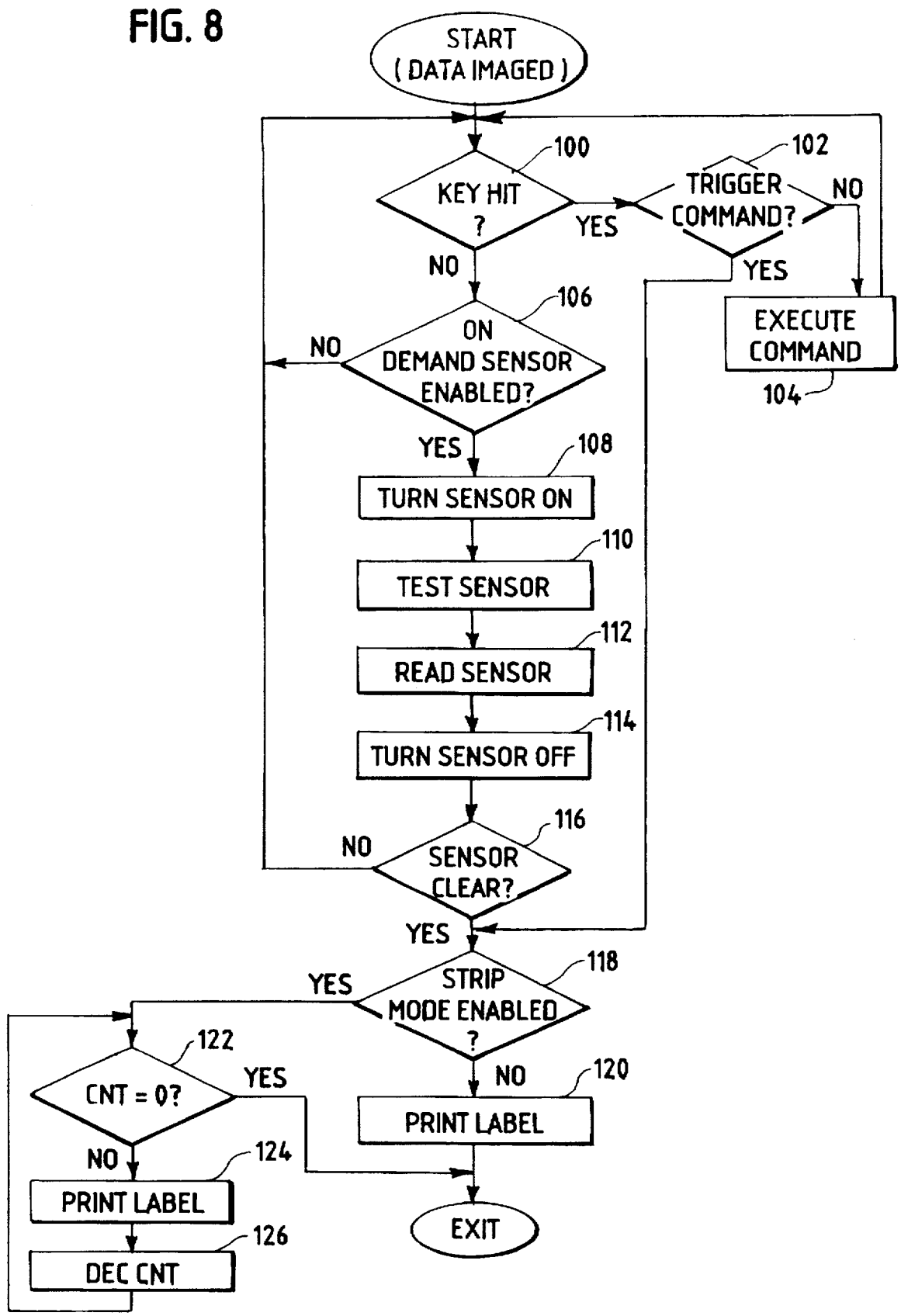
FIG. 8 is a flow chart illustrating the operation of the labeler in accordance with a print routine.

The operation of the labeler 10 for printing and dispensing labels according to various modes is illustrated in FIG. 8. When information to be printed on one or more labels has been imaged in a bit mapped memory of the RAM 90, the microprocessor 82 determines at a block 100 whether a key on the keyboard 18 of the labeler 10 has been actuated or not. If the microprocessor 82 determines that a key has been actuated, the microprocessor 82 proceeds to block 102 to determine whether the actuated key is the trigger switch 16. If so, the microprocessor 82 proceeds from block 102 to block 118 to print and dispense one label or a strip of labels depending upon whether a strip mode of the labeler 10 has been enabled or not. If the microprocessor 82 determines at block 102 that the actuated key did not represent the trigger command, the microprocessor 82 proceeds to block 104 to execute the command associated with the actuated key, thereafter returning to block 100.

If the microprocessor 82 determines at block 100 that a key has not been actuated, the microprocessor proceeds to block 106 to determine whether the on-demand sensor 48 has been enabled in an on-demand printing mode of operation. If the on-demand sensor 48 has been enabled in the on-demand printing mode, the microprocessor 82 proceeds to block 108 to test the sensor 48 to determine if it is operating correctly. From block 110, the microprocessor 82 proceeds to block 112 to read the output of the on-demand sensor 48 and, thereafter, at block 114 the microprocessor turns the sensor 48 off to conserve power. At block 116, the microprocessor 82 determines from the sensor output read at block 112 whether the sensor 48 has been cleared, i.e. whether the sensor 48 has detected an absence of a dispensed label. If the microprocessor 82 determines that the sensor 48 is not clear such that the sensor 48 is detecting the presence of a label, the microprocessor returns to block 100. If, however, the microprocessor 82 determines that the on-demand sensor 48 is clear, the microprocessor proceeds to block 118 to determine whether the strip of labels printing mode has been enabled. If not, the processor proceeds to block 120 to control the printhead 30 to print information on a label and to control the motor 84 to advance the web W to dispense a printed label so that it is supported on the label support 46 and ready for application by the applicator 36. If the microprocessor determines at block 118 that the strip mode has been enabled, the microprocessor proceeds to block 122. At block 122, the microprocessor 82 determines whether a strip label count, initially set by a user to the desired number of labels in a strip, is equal to zero. If not, the microprocessor proceeds to block 124 to print and dispense one label of the strip. Thereafter, at block 126, the microprocessor 82 decrements the strip label count by one and loops back to block 122 to continue to print labels which are dispensed in a continuous strip.

Figure 9:
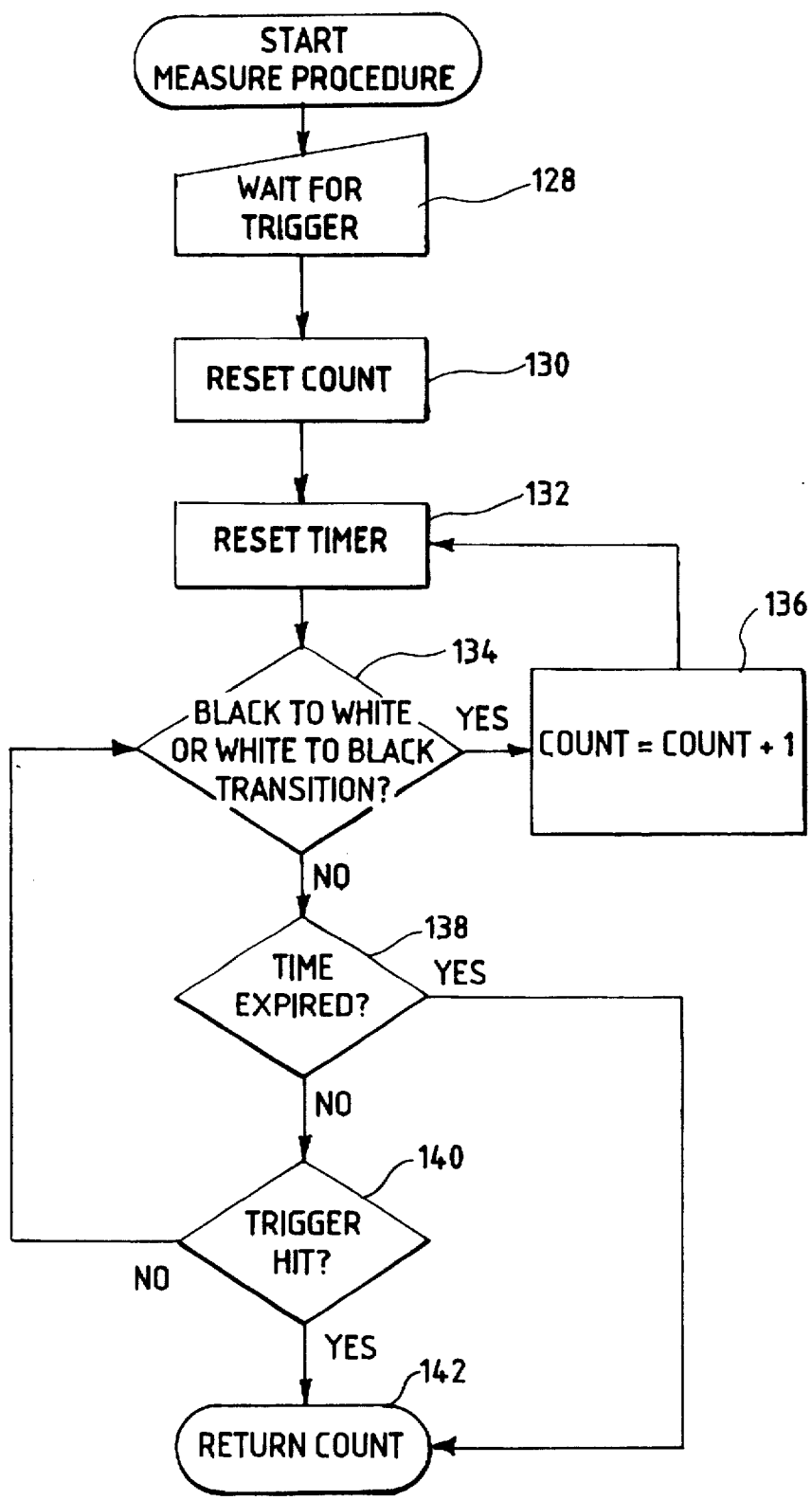
FIG. 9 is a flow chart illustrating a measure routine.

The microprocessor 82 operates in accordance with the flow chart of FIG. 9 to measure a dimension of an object across which the measuring wheel 50 and applicator 36 are rolled. At block 128, the microprocessor 82 waits for the receipt of a signal representing the actuation of the trigger switch 16 so as to indicate that the user is beginning a measuring procedure. Upon receipt of a trigger signal, the microprocessor 82 proceeds to block 130 to reset a counter to zero. Thereafter, at a block 132, the microprocessor resets a timer to zero also. The microprocessor 82 at block 134 then determines whether a black to white or white to black transition has been detected as representative by the output from the on-demand sensor 48. If one of these transitions has been detected, the microprocessor 82 proceeds to block 136 to increment the count of the counter by one, wherein each count of the counter represents a given distance such as 1/10th of an inch, for example. Each time a mark on the measuring wheel is detected at block 134 and the count of the counter is incremented at block 136, the microprocessor resets the timer to zero at block 132. If a mark is not detected at block 134, the microprocessor determines at block 138 whether the timer has reached a predetermined limit if the timer is counting up from a zero reset value at block 132 or, alternatively, whether the timer has expired if the timer is counting down from a predetermined non-zero reset value at block 132. If the microprocessor 82 determines that the predetermined time of the timer has expired at block 138, the microprocessor proceeds to block 142 to return to an application program the current count of the counter as representing the dimension that is measured with the measuring wheel 50 and sensor 48. If the timer has not expired as determined by the microprocessor at block 138, the microprocessor proceeds to block 140 to determine whether the trigger switch has been actuated a second time to signal the end of the measuring procedure. If the microprocessor 82 does not detect the actuation of the trigger switch 16 for a second time or the timer has not expired, the microprocessor continues to check for marks on the wheel 50 passing the sensor 48 so as to continue to increment the count representative of the measured dimension. Once the microprocessor determines that either the time of the timer has expired at block 138 or that the trigger switch has been actuated a second time at block 140, the microprocessor 82 proceeds to block 142 to return the count representing the measure dimension to either the application program for use therein or to a subroutine for calculating a dimension in a predetermined unit of measure for display on the display 26. It is noted, that the microprocessor 82 can utilize the count value accumulated during a measuring procedure to determine the length, width and height of an object being measured so as to generate therefrom a measure of the volume of the object. The microprocessor 82 can also calculate the price of an object or the price associated with the mailing or transportation of the object utilizing the measurement information alone or in combination with weight information according to equations stored in the memory 94 of the controller 80 or in accordance with look-up tables or the like stored therein. The weight information may be entered into the printer via the keyboard 22, the communication interface 92, or the like.

The labeler 10 of the present invention combines in a single hand-held device a number of functions such as printing, data collection and object measurement so as to easily allow a user to selectively perform any of these operations. Because these operations are accomplished by one device, the measurement information obtained from the measuring wheel 50 and sensor 48 may be displayed and/or automatically printed on a label to be applied to the object being measured. Further, this information may be combined with data collected via the barcode scanner 22 for printing on a label or for uploading to a host computer via the communication interface 92. Alternatively, each of these functions may be selectively operated independently of one another if the user desires. Further, because the on-demand sensor of the labeler is utilized to perform the measurement operation with the wheel 50, the device of the present invention is virtually no more expensive than the cost of a labeler alone. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A hand-held apparatus for measuring a dimension of an object and for printing on labels carried on a web comprising:

a housing;

a printhead mounted in said housing;

a motor for driving labels past said printhead for printing on a label and at least partially out from said housing to dispense a label;

an applicator mounted on said housing for applying a dispensed label, said applicator having a portion with a plurality of detectable marks spaced about a periphery thereof, said applicator portion being rotatable as said apparatus is rolled along a dimension of an object to be measured;

a sensor mounted on said housing in proximity to said applicator for detecting said marks as said applicator portion rotates; and a controller mounted in said housing and responsive to said sensor for counting the marks detected by said sensor as said applicator portion rotates to provide measurement information and said controller controlling said printhead to print.

2. A hand-held apparatus for measuring a dimension of an object and for printing on labels carried on a web as recited in claim 1 wherein said applicator includes a plurality of spaced ribs that engage a label to apply the label and said marks are disposed on said applicator portion between a pair of said spaced ribs.

3. A hand-held apparatus as recited in claim 2 wherein said ribs of said applicator have a diameter that is greater than a diameter of said applicator portion about which said marks are disposed such that said marks do not contact a label as said label is being applied by said applicator.

4. A hand-held apparatus as recited in claim 1 wherein said housing includes one or more stops for preventing said rotatable applicator portion from continuing to rotate beyond an edge of a measured object.

5. A hand held apparatus for measuring a dimension of an object and for printing on labels carried on a web comprising:

a housing;

a print head mounted in said housing;

a motor for driving labels past said print head for printing on a label and at least partially out from said housing to dispense a label;

an applicator mounted on said housing for applying a dispensed label, said applicator having a portion with a plurality of detectable marks spaced about a periphery thereof, said applicator portion being rotatable as said apparatus is rolled along a dimension of an object to be measured;

a sensor mounted on said housing in proximity to said applicator for detecting said marks as said applicator portion rotates, said sensor being mounted on said housing to detect a presence or absence of a dispensed label; and a controller mounted in said housing and responsive to said sensor for counting the marks detected by said sensor as said applicator portion rotates to provide measurement information, said controller controlling said print head to print, and said controller being responsive to said sensor for controlling said motor and print head depending upon the presence or absence of a dispensed label.

6. A hand-held apparatus for measuring a dimension of an object and for printing comprising a housing; a printhead mounted in said housing for printing information on a supply; a measuring wheel mounted on said housing for rotation as said apparatus is rolled along a dimension of an object to be measured, said measuring wheel having detectable marks spaced about the periphery thereof; a sensor mounted on said housing for detection of said marks as said wheel is rotated, said housing having at least one stop formed thereon in proximity to said measuring wheel for preventing said measuring wheel from rotating beyond an edge of an object being measured; and a controller for controlling said printer to print and responsive to said sensor for determining a measurement value from said detected marks.

7. A hand-held apparatus for measuring a dimension of an object and for printing comprising a housing having a handle; a manually actuated trigger switch mounted at said handle; a printhead mounted in said housing for printing information on a supply; a measuring wheel mounted on said housing for rotation as said apparatus is rolled along a dimension of an object to be measured, said measuring wheel having detectable marks spaced about the periphery thereof; a sensor mounted on said housing for detection of said marks as said wheel is rotated; said housing having at least one stop formed thereon in proximity to said measuring wheel for preventing said measuring wheel from rotating beyond an edge of an object being measured; and a controller responsive to said trigger switch for printing a label and said controller being responsive to said sensor for determining a measurement value from said detected marks.

8. A hand-held apparatus for measuring a dimension of an object and for printing comprising a housing; a printhead mounted in said housing for printing information on a supply; a measuring wheel mounted on said housing for rotation as said apparatus is rolled along a dimension of an object to be measured, said measuring wheel having detectable marks spaced about the periphery thereof; a sensor mounted on said housing for detection of said marks as said wheel is rotated, and a controller for turning on said sensor when a measurement is to be made, said controller being responsive to said sensor for determining a measurement value from said detected mark and said controller controlling said printer to print.

9. An apparatus for measuring a dimension of an object and for printing on labels carried on a web comprising:

a housing;

a printhead mounted in said housing;

a motor for driving labels past said printhead for printing on a label and at least partially out from said housing to dispense a label;

a sensor positioned on said housing to detect the presence or absence of a dispensed label;

a measuring wheel rotatably mounted on said housing in proximity to said sensor, said measuring wheel having marks spaced about the periphery thereof, said marks being detectable by said sensor; and a controller that is responsive to said sensor in a first mode of operation for controlling said printhead to print depending upon the presence or absence of a dispensed label and that is responsive to said sensor in a second mode of operation for counting the marks passing said sensor as said measuring wheel is rotated along a dimension of an object, said mark count representing a measure of said dimension.

10. An apparatus for measuring a dimension of an object and for printing on labels carried on a web as recited in claim 9 including an applicator disposed above a dispensed label, said measuring wheel being mounted on said applicator.

11. An apparatus for measuring a dimension of an object and for printing on labels carried on a web as recited in claim 10 wherein said applicator includes spaced ribs that engage a label to apply the label and said measuring wheel is disposed between a pair of adjacent ribs such that said wheel does not engage a label when the label is being applied by said applicator.

12. An apparatus for measuring a dimension of an object and for printing on labels carried on a web as recited in claim 11 wherein said ribs are circular and rotatable and said measuring wheel is mounted on said applicator so as to rotate with said ribs.

13. An apparatus for measuring a dimension of an object and for printing on labels carried on a web as recited in claim 9 including a user operable input device for selecting said mode of operation.

14. An apparatus for measuring a dimension of an object and for printing on labels carried on a web as recited in claim 9 including a memory for storing a software routine according to which said controller operates, said software routine determining said mode of operation without requiring user input.

15. An apparatus for measuring a dimension of an object and for printing on labels carried on a web as recited in claim 9 including a switch actuable by a user in said second mode to signal the start of a dimension measurement with said measuring wheel.

16. An apparatus for measuring a dimension of an object and for printing on labels carried on a web as recited in claim 15 including a display for depicting a message to prompt a user to actuate said switch to start a measurement.

17. An apparatus for measuring a dimension of an object and for printing on labels carried on a web as recited in claim 15 wherein said controller is responsive to a first actuation of said switch in said second mode to start counting said marks on said measuring wheel and is responsive to a second actuation of said switch in said second mode to stop counting said marks.

18. An apparatus for measuring a dimension of an object and for printing on labels carried on a web as recited in claim 15 wherein said switch is actuable by a user in a third mode of operation to control the printing and dispensing of a label.

19. An apparatus for measuring a dimension of an object and for printing on labels carried on a web as recited in claim 15 wherein said apparatus is a hand-held label printer having a handle and said switch is mounted at said handle.

20. An apparatus for measuring a dimension of an object and for printing on labels carried on a web as recited in claim 15 including a timer for measuring the time between the detection of marks by said sensor, said controller being responsive to said timer reaching a predetermined time to stop counting said marks.

21. An apparatus for measuring a dimension of an object and for printing on labels carried on a web as recited in claim 15 including one or more stops on said housing for preventing said measuring wheel from continuing to rotate beyond an edge of a measured object.

22. A hand-held apparatus for measuring and printing comprising:

a housing having a handle;

a manually actuated trigger switch mounted at said handle;

a printhead mounted in said housing for printing information on a supply;

a measuring wheel rotatably mounted on said housing, said measuring wheel having detectable marks spaced about the periphery thereof;

a sensor mounted on said housing in proximity to said measuring wheel for detection of said marks as said wheel is rotated;

a controller responsive to the actuation of said trigger switch for counting said detected marks to provide a measurement value in one mode of operation and said controller being responsive to the actuation of said trigger switch in another mode of operation for controlling said printhead to print.

23. A hand-held apparatus for measuring, and printing as recited in claim 22 wherein said controller utilizes said measurement value to provide information to be printed on said supply and said controller controls said printhead to print said information on said supply.

24. A hand-held apparatus for measuring, and printing as recited in claim 22 including a barcode scanner mounted on said housing for detecting a barcode and providing barcode information representative of a detected barcode and wherein said controller utilizes said measurement value to provide first print data and utilizes said barcode information to provide second print data and said controller controls said printhead to print said first print data with said second print data on said supply.

25. A hand-held apparatus for measuring, and printing as recited in claim 24 wherein said first print data includes data representing a price derived utilizing said measurement value.

26. A hand-held apparatus for measuring, and printing as recited in claim 22 including a user operable input device for selecting said mode of operation.

27. A hand-held apparatus for measuring, and printing as recited in claim 22 including a memory for storing a software routine according to which said controller operates, said software routine determining said mode of operation without requiring user input.

28. A hand-held apparatus for measuring, and printing as recited in claim 22 wherein said trigger switch is actuable by a user in said one mode to signal the start of a dimension measurement with said measuring wheel.

29. A hand-held apparatus for measuring, and printing as recited in claim 28 including a display for depicting a message to prompt a user to actuate said trigger switch to start a measurement.

30. A hand-held apparatus for measuring, data collecting and printing as recited in claim 28 wherein said controller is responsive to a first actuation of said trigger switch in said one mode to start counting said marks on said measuring wheel and is responsive to a second actuation of said trigger switch in said one mode to stop counting said marks.

31. A hand-held apparatus for measuring, and printing as recited in claim 22 including a timer for measuring the time between the detection of marks by said sensor, said controller being responsive to said timer reaching a predetermined time to stop counting said marks in said one mode.

32. A hand held apparatus for measuring and printing comprising:

a housing having a handle;

a manually actuated trigger switch mounted at said handle;

a print head mounted in said housing for printing information on a supply;

a motor for driving said supply past said print head and at least partially out from said housing to dispense said supply after printing thereon;

a measuring wheel rotatable mounted on said housing, said measuring wheel having detectable marks spaced about the periphery thereof;

a sensor mounted on said housing in proximity to said measuring wheel for detection of said marks as said wheel is rotated, said sensor being mounted on said housing to detect a presence or absence of a dispensed supply;

a controller responsive to the actuation of said trigger switch for counting said detected marks to provide a measurement value in one mode of operation, said controller being responsive to the actuation of said trigger switch in another mode of operation for controlling said print head to print, and said controller being responsive to said sensor in an additional mode of operation for controlling said motor and print head depending upon the presence or absence of a dispensed supply.

33. A hand held apparatus for measuring and printing comprising:

a housing having a handle;

a manually actuated trigger switch mounted at said handle;

a print head mounted in said housing for printing information on a supply;

a measuring wheel rotatably mounted on said housing, said measuring wheel having detectable marks spaced about the periphery thereof;

one or more stops on said housing for preventing said measuring wheel from continuing to rotate beyond an edge of a measured object;

a sensor mounted on said housing in proximity to said measuring wheel for detection of said marks as said wheel is rotated;

and a controller responsive to the actuation of said trigger switch for counting said detected marks to provide said measurement value in one mode of operation and said controller being responsive to the actuation of said trigger switch in another mode of operation for controlling said print head to print.

34. A hand-held apparatus for measuring, and printing as recited in claim 33 wherein said stops include a pair of cam surfaces integrally formed on said housing in proximity to said measuring wheel.

* * * * *